United States Patent
Sano et al.

(10) Patent No.: US 10,450,430 B2
(45) Date of Patent: Oct. 22, 2019

(54) ADHESIVE COMPOSITION FOR OIL SILICONE RUBBER

(71) Applicant: NOK CORPORATION, Tokyo (JP)

(72) Inventors: Shinichiro Sano, Kanagawa (JP); Isao Yoshitake, Kanagawa (JP); Katsumi Abe, Kanagawa (JP)

(73) Assignee: NOK Corporation, Tokyo (JP)

( * ) Notice: Subject to any disclaimer, the term of this patent is extended or adjusted under 35 U.S.C. 154(b) by 164 days.

(21) Appl. No.: 15/522,010

(22) PCT Filed: Oct. 23, 2015

(86) PCT No.: PCT/JP2015/079988
§ 371 (c)(1),
(2) Date: Apr. 26, 2017

(87) PCT Pub. No.: WO2016/068044
PCT Pub. Date: May 6, 2016

(65) Prior Publication Data
US 2017/0321022 A1    Nov. 9, 2017

(30) Foreign Application Priority Data
Oct. 29, 2014   (JP) .................................. 2014-220302

(51) Int. Cl.
| | | |
|---|---|---|
| C08J 5/12 | (2006.01) | |
| C09J 11/06 | (2006.01) | |
| B32B 7/12 | (2006.01) | |
| B32B 15/06 | (2006.01) | |
| B32B 15/092 | (2006.01) | |
| C09J 4/00 | (2006.01) | |
| C09J 183/00 | (2006.01) | |

(52) U.S. Cl.
CPC ................ *C08J 5/125* (2013.01); *B32B 7/12* (2013.01); *B32B 15/06* (2013.01); *B32B 15/092* (2013.01); *C09J 4/00* (2013.01); *C09J 11/06* (2013.01); *C09J 183/00* (2013.01); *C08J 2383/04* (2013.01); *C08J 2443/04* (2013.01)

(58) Field of Classification Search
CPC . C08J 5/125; B32B 7/12; B32B 15/06; B32B 15/095; B32B 15/092; C09J 4/00; C09J 11/06; C09J 183/00
See application file for complete search history.

(56) References Cited

U.S. PATENT DOCUMENTS

| | | | |
|---|---|---|---|
| 4,690,966 | A | 9/1987 | Rende, Jr. |
| 4,749,741 | A | 6/1988 | Saito et al. |
| 5,985,371 | A | 11/1999 | Fujioka et al. |

FOREIGN PATENT DOCUMENTS

| | | |
|---|---|---|
| EP | 0 280 423 A2 | 8/1988 |
| JP | 55-066951 A | 5/1980 |
| JP | 58-162660 A | 9/1983 |
| JP | 62-280279 A | 12/1987 |
| JP | 63-227685 A | 9/1988 |
| JP | 1-123880 A | 5/1989 |
| JP | 6-306333 A | 11/1994 |
| JP | 06-340850 | 12/1994 |
| JP | 7-034054 A | 2/1995 |
| JP | 7-216309 A | 8/1995 |
| JP | 10-219197 A | 8/1998 |
| JP | 2010-215719 A | 9/2010 |
| JP | 2015-010178 A | 1/2015 |

OTHER PUBLICATIONS

English machine translation of JP 58-162660. Sep. 27, 1983. (Year: 1983).*
International Search Report from corresponding PCT application No. PCT/JP2015/079988 dated Jan. 26, 2016 (4 pgs).
International Preliminary Report on Patentability and Written Opinion from corresponding PCT application No. PCT/JP2015/079988 dated May 2, 2017 (7 pgs).

* cited by examiner

*Primary Examiner* — John E Uselding
(74) *Attorney, Agent, or Firm* — Brinks Gilson & Lione

(57) ABSTRACT

An adhesive composition for oil bleeding silicone rubber comprising any of: (A) an alcohol-based organic solvent solution adding 45 to 120 parts by weight of organometallic compound and 2 to 10 parts by weight of water, based on 100 parts by weight of vinyltrialkoxysilane, (B) a solution in which 5 parts by weight or less, preferably 1 to 5 parts by weight, of 3-aminopropyltrialkoxysilane is added to the above alcohol-based organic solvent solution (A), or (C) a solution in which uncrosslinked silicone rubber dissolved beforehand in an organic solvent is added to the above alcohol-based organic solvent solution (A) or (B) in which the amount of the organometallic compound is changed to 5 to 20 parts by weight, at a ratio of 0.1 to 5 wt. %, based on the total solid matters of vinyltrialkoxysilane and the organometallic compound. The adhesive composition has excellent adhesion to various substrates, including metals.

7 Claims, No Drawings

ADHESIVE COMPOSITION FOR OIL SILICONE RUBBER

RELATED APPLICATION

This application is a 35 U.S.C. § 371 national phase filing of International Patent Application No. PCT/JP2015/079988, filed Oct. 23, 2015, which claims priority under 35 U.S.C. § 119 to Japanese Patent Application No. 2014-220302, filed Oct. 29, 2014, the entire disclosure of which is hereby expressly incorporated by reference.

TECHNICAL FIELD

The present invention relates to an adhesive composition for oil bleeding silicone rubber. More particularly, the present invention relates to an adhesive composition for oil bleeding silicone rubber that has improved adhesion to various substrates.

BACKGROUND ART

Conventionally, adhesives for various silicone rubber are commercially available. When these adhesives are used for bonding between oil bleeding silicone rubber and metal, plastic, or the like, the silicone oil contained in the silicone rubber bleeds and inhibits bonding. Thus, a sufficient initial adhesive cannot be obtained. Moreover, commercially available adhesives for oil bleeding silicone rubber comprise uncrosslinked rubber as a main component; therefore, the coating films of the adhesives are flexible, causing problems, such as contamination of the metal mold during rubber crosslinking molding, and contamination of the product itself by the overflowing adhesive.

Patent Document 1 discloses an adhesive composition for oil bleeding silicone rubber suitable for primerless molding using an injection molding method and providing excellent adhesion to thermoplastic resin in the process of integral molding of a cured product of the adhesive composition for oil bleeding silicone rubber with thermoplastic resin, such as polybutylene terephthalate, 6T nylon, aromatic polyamide containing 30% glass fiber, polycarbonate, or the like. The adhesive composition for oil bleeding silicone rubber is effective for thermoplastic resins, but is problematically ineffective for metal substrates.

PRIOR ART DOCUMENT

Patent Document

Patent Document 1: JP-A-2010-215719

OUTLINE OF THE INVENTION

Problem to be Solved by the Invention

An object of the present invention is to provide an adhesive composition for oil bleeding silicone rubber having excellent adhesion to various substrates, including metals.

Means for Solving the Problem

The above object of the present invention can be achieved by:

(A) an adhesive composition for oil bleeding silicone rubber comprising an alcohol-based organic solvent solution adding 45 to 120 parts by weight of an organometallic compound and 2 to 10 parts by weight of water, based on 100 parts by weight of vinyltrialkoxysilane;

(B) an adhesive composition for oil bleeding silicone rubber comprising an alcohol-based organic solvent solution adding 45 to 120 parts by weight of an organometallic compound, 5 parts by weight or less, preferably 1 to 5 parts by weight, of 3-aminopropyltrialkoxysilane, and 2 to 10 parts by weight of water, based on 100 parts by weight of vinyltrialkoxysilane; or (C) an adhesive composition for oil bleeding silicone rubber comprising a solution in which uncrosslinked silicone rubber dissolved beforehand in an organic solvent is added to the above alcohol-based organic solvent solution (A) or (B) in which the amount of the organometallic compound is changed to 5 to 20 parts by weight, at a ratio of 0.1 to 5 wt. %, based on the total solid matters of vinyltrialkoxysilane and the organometallic compound.

Effect of the Invention

The adhesive composition for oil bleeding silicone rubber according to the present invention is effective not only for thermoplastic resin, but also for metal substrates, and provides a highly hard and tack-free adhesive coating film. Thus, problems, such as contamination of the metal mold during rubber crosslinking molding, and product contamination, do not occur. Further, the adhesive composition comprises a silane coupling agent and an organometallic compound as main components, and thus easily forms a diffusion layer together with oil bleeding silicone rubber, thereby increasing the adhesion to the substrate. In addition, through firm bonding of the adhesive composition to a substrate material containing a glass/epoxy resin prepreg, which is a substrate material with poor wettability and difficulty in uniform coating of the adhesive, the bonding surface is less likely to be affected by the bleeding silicone oil.

The adhesive composition for oil bleeding silicone rubber of the present invention having such effects can be effectively used for bonding between various substrates and oil bleeding silicone rubber. For example, the adhesive composition for oil bleeding silicone rubber of the present invention can be effectively applied to sealing materials, such as gaskets and packing; wire connector seals for vehicles used in portions in contact with engineering plastics; and the like.

EMBODIMENTS FOR CARRYING OUT THE INVENTION

Examples of vinyltrialkoxysilane include vinyltrimethoxysilane, vinyltriethoxysilane, vinyltriisopropoxysilane, vinyltributoxysilane, vinyltris(β-methoxyethoxy)silane, γ-methacryloxypropyltrimethoxysilane, γ-methacryloxypropylmethyldiethoxysilane, γ-methacryloxypropyltriethoxysilane, vinyloxypropyltrimethoxysilane, butylene trimethoxysilane, octylene trimethoxysilane, 3-acryloxypropyltrimethoxysilane, allyltriethoxysilane, and the like; vinyltrimethoxysilane, vinyltriethoxysilane, etc., are preferably used.

As the organometallic compound, an organic titanium compound, an organic zirconium compound, an organic aluminum compound, or the like is used. Examples of organic titanium compounds include tetraisopropyl titanate, tetra-n-butyl titanate or a dimer thereof, tetra(2-ethylhexyl) titanate, titanium acetylacetonate compounds, and the like; tetra-n-butyl titanate or a dimer thereof is preferably used.

Examples of organic zirconium compounds include zirconium compounds corresponding to these titanium compounds. Further, examples of organic aluminum compounds include ethylacetoacetate aluminum diisopropoxide, aluminum tris(ethylacetoacetate), aluminum monoacetylacetonate bis(ethylacetoacetate), and the like.

The organometallic compound is used at a ratio of about 45 to 120 parts by weight, preferably about 80 to 120 parts by weight, based on 100 parts by weight of vinyltrialkoxysilane. If the amount of organometallic compound used is less than this range, desired improvement in adhesion cannot be achieved. In contrast, if the amount of organometallic compound used is greater than this range, the molecular weight is overly increased, and the compounding components in the adhesive composition are deposited and precipitated, thereby failing to form an adhesive.

In the preparation of the adhesive composition, an alcohol-based organic solvent, such as methanol, ethanol, isopropanol, butanol, or an organic solvent containing such an alcohol, which is generally used in an amount of about 2 to 10 times based on the weight of vinyltrialkoxysilane, and pure water in an amount about 0.02 to 0.1 times based on the weight of vinyltrialkoxysilane are added to vinyltrialkoxysilane, and the mixture is stirred well, thereby forming a uniform solution. Due to the addition of pure water at the above ratio, the increase in the molecular weight of the silane coupling agent is promoted, and excellent coating properties and leveling properties are obtained. The mixed solution comprising these components is aged under temperature conditions of about 20 to 50° C. for 24 hours or more, thereby obtaining the adhesive composition of the present invention. Due to the aging process, the adhesive composition can easily form a uniform coating film even on a smooth adherend.

In addition to each of the above components, 5 parts by weight or less, preferably about 1 to 5 parts by weight, of 3-aminopropyltrialkoxysilane, preferably 3-aminopropyltriethoxysilane, may be added and used. In this case, the adhesion to a prepreg can be significantly improved. However, the use of 3-aminopropyltrialkoxysilane at a ratio of greater than the above range does not contribute to the effect of improving adhesion.

Further, the adhesive composition for oil bleeding silicone rubber of the present invention can also be formed a product obtained by adding uncrosslinked silicone rubber dissolved beforehand in an organic solvent at a ratio of about 0.1 to 5 wt. %, based on the total solid matter of vinyltrialkoxysilane and organometallic compound, to the above adhesive compositions. The uncrosslinked silicone rubber used is polyorganosiloxane, preferably linear polydivinylsiloxane in which at least two of the organic groups bonded to the silicon atom in one molecule are vinyl groups. In addition, polyorganosiloxane having no vinyl group, or branched or cyclic polyorganosiloxane can also be used.

The uncrosslinked silicone rubber is generally dissolved in an aromatic hydrocarbon solvent, such as benzene, toluene, or xylene, in an amount about 20 to 100 times based on the weight of the uncrosslinked silicone rubber, and used at a ratio of about 0.1 to 5 wt. %, preferably about 0.1 to 3 wt. %, based on the total solid matters of vinyltrialkoxysilane and organometallic compound. Commercially available adhesive solutions comprising the same compounding components, to which ethanol, silica, or the like is added (e.g., Chemlok 600, produced by Load Far East Inc.), can be used. By means of compounding the uncrosslinked silicone rubber, adhesion of an oil bleeding silicone rubber composition having a particularly high oil content can be significantly improved.

When the uncrosslinked silicone rubber is added and used, the less the ratio of organometallic compound to vinyltrialkoxysilane is, the more remarkable the improvement of adhesive reliability is. Therefore, the organometallic compound is used at a ratio of about 5 to 20 parts by weight, based on 100 parts by weight of vinyltrialkoxysilane.

These adhesive compositions are used for crosslinking bonding between oil bleeding silicone rubber compositions and various substrates. In the oil bleeding silicone rubber composition, oil bleeding silicone oil is compounded blended as one component of the composition in organopolysiloxane typified by polydimethylsiloxane, polymethylphenylsiloxane, etc.; addition-type or heat-curable silicone rubber, or the like.

The silicone oil for use in the present invention includes an organopolysiloxane having at least one organic group bonded to the silicon atom and having a kinematic viscosity at 25° C. of 50 to 1,000,000 $mm^2$/sec., preferably 500 to 200,000 $mm^2$/sec., where its molecular structure may be any of linear, branched or reticularte structures, preferably linear or branched one, more preferably linear one. The organic group bonded to the silicon atom of organopolysiloxane is typically an alkyl group such as methyl, ethyl, propyl, butyl, or hexyl group; an alkenyl group such as vinyl, or propenyl group; an aryl group such as phenyl group; an aralkyl group such as phenethyl group; and those hydrocarbon groups, some of whose hydrogen atoms are substituted by a halogen atom, a nitrile group, etc. The terminal organic group of organopolysiloxane is typically methyl, amino, epoxy, carbinol, hydroxyl, methoxy, methacryloxy, carboxyl, silanol, alkoxy group, etc., and preferably carbinol, hydroxyl or methoxy group. The silicone oil can give a lubricability, a low friction, and a non-stickiness to the surface-treatment film.

Moreover, examples of the substrate include any of metals, such as stainless steel and aluminum; and thermoplastic resins, such as polyamide, polyacetal, polycarbonate, and polybutylene terephthalate; and the like. The adhesive composition is further diluted with, as necessary, toluene, 2-butanone (ethyl methyl ketone), or the like to a solid matters content of about 1 to 15 wt. %, and then applied as an adhesive coating liquid to such a substrate. The applied adhesive coating liquid is dried under room temperature conditions, followed by heating at about 100 to 180° C. for about 5 to 20 minutes. To the resultant, an uncrosslinked oil bleeding silicone rubber composition containing a crosslinking agent, such as organic peroxide, is bonded. Then, pressure crosslinking is performed at about 150 to 200° C. for about 3 to 7 minutes, optionally followed by oven crosslinking (secondary crosslinking) at about 150 to 220° C. for about 1 to 15 hours. Thus, the substrate and the oil bleeding silicone rubber are bonded together.

Depending on the type of substrate, some substrates have poor wettability with the adhesive composition, and consequently a liquid pool is sometimes generated, thereby failing to obtain uniform coating. In that case, 3-aminopropyltrialkoxysilane is added to the adhesive composition, and the resulting mixture is mixed well and aged at about 20 to 50° C. for 24 hours or more, thereby imparting excellent wettability and leveling properties to the adhesive composition.

EXAMPLES

The present invention will be described in detail below, referring to Examples.

Example 1

| | |
|---|---|
| Vinyltrimethoxysilane | 100 parts by weight |
| Tetra-n-butyl titanate | 100 parts by weight |
| n-butyl alcohol | 790 parts by weight |
| Pure water | 8 parts by weight |

A mixed solution of the above components was prepared, and aged at 40° C. for 48 hours, thereby obtaining an adhesive composition.

Example 2

| | |
|---|---|
| Vinyltriethoxysilane | 100 parts by weight |
| Tetra-n-butyl titanate dimer | 100 parts by weight |
| Isopropyl alcohol | 790 parts by weight |
| Pure water | 8 parts by weight |

A mixed solution of the above components was prepared, and aged at 40° C. for 48 hours, thereby obtaining an adhesive composition.

Example 3

| | |
|---|---|
| Vinyltrimethoxysilane | 100 parts by weight |
| Tetra-n-butyl titanate | 100 parts by weight |
| 3-aminopropyltriethoxysilane | 2 parts by weight |
| n-butyl alcohol | 790 parts by weight |
| Pure water | 8 parts by weight |

A mixed solution of the above components was prepared, and aged at 40° C. for 48 hours, thereby obtaining an adhesive composition.

Example 4

| | |
|---|---|
| Vinyltrimethoxysilane | 100 parts by weight |
| Tetra-n-butyl titanate | 10 parts by weight |
| Isopropyl alcohol | 330 parts by weight |
| Pure water | 3 parts by weight |

A mixed solution of the above components was prepared, and aged at 40° C. for 48 hours, thereby obtaining a liquid A.

Further, 1 part by weight of uncrosslinked silicone rubber (X-34-1897A, produced by Shin-Etsu Chemical Co., Ltd.) was dissolved in 99 parts by weight of toluene to obtain a liquid B. The liquids A and B were mixed at a weight ratio of 4:1, thereby obtaining an adhesive composition (0.23 wt. % of uncrosslinked silicone rubber, based on the total amount of vinyltrimethoxysilane and tetra-n-butyl titanate).

Example 5

In Example 4, an adhesive composition was obtained using Chemlok 600 (produced by Lord Far East Inc.; uncrosslinked silicone rubber concentration: 1.0 wt. %) as the liquid B.

Comparative Example 1

In Example 1, the amount of tetra-n-butyl titanate was changed to 40 parts by weight.

Comparative Example 2

In Example 1, the amount of tetra-n-butyl titanate was changed to 200 parts by weight.

Comparative Example 3

In Example 3, the amount of 3-aminopropyltriethoxysilane was changed to 10 parts by weight.

The adhesive compositions of Examples 1 to 3 and Comparative Examples 1 to 3 that were aged at 40° C. for 48 hours were observed. As a result, in Comparative Example 2, the molecular weight was overly increased, and the compounding components were thus deposited and precipitated, thereby failing to obtain an adhesive. 100 parts by weight of other adhesive compositions were each dissolved in 180 parts by weight of 2-butanone to prepare adhesive coating liquids. The resulting adhesive coating liquids were each applied to a SUS304 plate and a polybutylene terephthalate (PBT) plate, both of which had been degreased with an organic solvent. The applied adhesive coating liquids were dried by allowing them to stand under room temperature conditions for 5 minutes, followed by heat treatment at 100° C. for 10 minutes.

Moreover, 100 parts by weight of the adhesive compositions of Examples 4 and 5 were each dissolved in 900 parts by weight of toluene to prepare adhesive coating liquids, and the resulting adhesive coating liquids were subjected to the same procedure. However, the drying under room temperature conditions was changed to for 10 minutes, and the conditions of the heat treatment were changed to at 150° C. for 10 minutes.

An oil bleeding silicone rubber compound (DY-32-3067, produced by Dow Corning Toray Co., Ltd.) to which silicone oil was added was bonded to these adhesive-coated plates. Then, pressure crosslinking was performed at 180° C. for 4 minutes, followed by secondary crosslinking at 200° C. for 4 hours. The resulting bonded products were subjected to a 90° peeling test according to JIS K-6256 corresponding to ISO 23529, and the peel strength and the rubber remaining area ratio were measured.

<When 2 wt. % of Silicone Oil was Added>

TABLE 1

| | Ex. | | | | | Comp. Ex. | |
|---|---|---|---|---|---|---|---|
| Measurement item | 1 | 2 | 3 | 4 | 5 | 1 | 3 |
| [SUS304] | | | | | | | |
| Peel strength (N/mm) | 3.7 | 3.5 | 3.4 | 3.5 | 3.7 | 1.7 | 0.9 |
| Rubber remaining area ratio (%) | 100 | 100 | 100 | 100 | 100 | 70 | 10 |
| [PBT] | | | | | | | |
| Peel strength (N/mm) | 3.0 | 3.2 | 2.9 | 3.0 | 3.1 | 1.0 | 0.8 |
| Rubber remaining area ratio (%) | 90 | 90 | 90 | 95 | 95 | 30 | 0 |

<When 10 wt. % of Silicone Oil was Added>

TABLE 2

| Measurement item | Ex. | | | | | Comp. Ex. | |
| --- | --- | --- | --- | --- | --- | --- | --- |
| | 1 | 2 | 3 | 4 | 5 | 1 | 3 |
| [SUS304] | | | | | | | |
| Peel strength (N/mm) | 1.9 | 1.5 | 1.6 | 3.3 | 3.2 | 0.2 | 0.1 |
| Rubber remaining area ratio (%) | 40 | 50 | 50 | 100 | 100 | 0 | 0 |
| [PBT] | | | | | | | |
| Peel strength (N/mm) | 1.2 | 1.2 | 1.0 | 2.9 | 3.0 | 0.1 | 0.1 |
| Rubber remaining area ratio (%) | 40 | 30 | 40 | 90 | 95 | 0 | 0 |

Further, the adhesion (peel strength and rubber remaining area ratio) to a glass-epoxy resin prepreg (without surface polish treatment), which was a substrate material with poor wettability and difficulty in uniform coating of the adhesive, was measured.

The above-mentioned adhesive coating liquids of Examples 1 to 3, and Comparative Examples 1 and 3 were each applied to the prepreg degreased with an organic solvent. The applied adhesive coating solutions were dried under room temperature conditions for 10 minutes, followed by heat treatment at 120° C. for 10 minutes. Further, the above-mentioned adhesive coating liquids of Examples 4 and 5 were each applied to the prepreg degreased with an organic solvent. The applied adhesive coating liquids were dried under room temperature conditions for 10 minutes, followed by heat treatment at 150° C. for 10 minutes.

The above-mentioned oil bleeding silicone rubber compound to which 2 wt. % of silicone oil was added was bonded to these adhesive-coated plates, and curing was performed under the same conditions. Table 3 below shows the obtained results.

TABLE 3

| Measurement item | Ex. | | | | | Comp. Ex. | |
| --- | --- | --- | --- | --- | --- | --- | --- |
| | 1 | 2 | 3 | 4 | 5 | 1 | 3 |
| [Prepreg] | | | | | | | |
| Peel strength (N/mm) | 1.7 | 2.0 | 3.3 | 3.1 | 3.3 | 1.0 | 0.2 |
| Rubber remaining area ratio (%) | 50 | 50 | 100 | 100 | 100 | 10 | 0 |

The invention claimed is:

1. An adhesive composition for oil bleeding silicone rubber comprising vinyltrialkoxysilane, an organic titanium compound, water, and 3-aminopropyltrioxysilane in an alcohol-based organic solvent solution, wherein the amount of organic titanium compound is 5 to 20 parts by weight, the amount of water is 2 to 10parts by weight, and the amount of 3-aminopropyltrialkoxysilane is 0 to 5 parts by weight or less, based on 100 parts by weight of vinyltrialkoxysilane, and wherein uncrosslinked silicone rubber is included in the alcohol-based organic solvent solution at a ratio of 0.1 to 5 wt. %, based on the total solid matters of vinyltrialkoxysilane and the organic titanium compound.

2. The adhesive composition for oil bleeding silicone rubber according to claim 1, wherein the organic solvent in which uncrosslinked silicone rubber is dissolved beforehand is an aromatic hydrocarbon solvent.

3. The adhesive composition for oil bleeding silicone rubber according to claim 1, wherein the organic titanium compound is tetra-n-butyl titanate or a dimer thereof.

4. The adhesive composition for oil bleeding silicone rubber according to claim 1, wherein the oil bleeding silicone rubber is silicone oil-compounding silicone rubber.

5. The adhesive composition for oil bleeding silicone rubber according to claim 1, wherein the composition is aged under temperature conditions of 20 to 50° C. for 24 hours or more.

6. The adhesive composition for oil bleeding silicone rubber according to claim 1, wherein the composition is used for bonding between a metal, a thermoplastic resin, or a glass-epoxy resin prepreg, and oil bleeding silicone rubber.

7. An integrally molded product of a metal, a thermoplastic resin, or a glass-epoxy resin prepreg, and oil bleeding silicone rubber, which are bonded and integrated with each other using the adhesive composition for oil bleeding silicone rubber according to claim 1.

* * * * *